(12) United States Patent
Shigeeda

(10) Patent No.: US 7,278,021 B2
(45) Date of Patent: Oct. 2, 2007

(54) INFORMATION PROCESSING DEVICE, INFORMATION PROCESSING SYSTEM, AUTHENTICATION METHOD, STORAGE MEDIUM AND PROGRAM

(75) Inventor: Nobuyuki Shigeeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 10/357,195

(22) Filed: Feb. 4, 2003

(65) Prior Publication Data

US 2003/0154413 A1 Aug. 14, 2003

(30) Foreign Application Priority Data

Feb. 5, 2002 (JP) .............................. 2002-028574

(51) Int. Cl.
  *H04K 1/00* (2006.01)
  *H04L 9/00* (2006.01)
(52) U.S. Cl. ...................... 713/182; 713/165; 713/167; 713/168; 713/183; 711/163; 711/164; 726/2; 726/5; 726/27; 726/28; 707/9
(58) Field of Classification Search ................. 726/27, 726/28, 2, 5; 707/9; 713/165, 167, 168, 713/182, 183; 711/163, 164
See application file for complete search history.

(56) References Cited

U.S. PATENT DOCUMENTS

| | | | | |
|---|---|---|---|---|
| 5,732,137 A | * | 3/1998 | Aziz | ........................... 713/155 |
| 6,343,324 B1 | * | 1/2002 | Hubis et al. | ................. 709/229 |
| 6,484,173 B1 | * | 11/2002 | O'Hare et al. | .................. 707/9 |
| 6,934,817 B2 | * | 8/2005 | Ellison et al. | ............... 711/153 |
| 7,010,686 B2 | * | 3/2006 | Thoone et al. | ............... 713/165 |
| 7,178,033 B1 | * | 2/2007 | Garcia | ......................... 713/184 |
| 2001/0020254 A1 | * | 9/2001 | Blumenau et al. | ........... 709/229 |

* cited by examiner

*Primary Examiner*—Kim Vu
*Assistant Examiner*—Beemnet W Dada
(74) *Attorney, Agent, or Firm*—Fitzpatrick, Cella, Harper & Scinto

(57) ABSTRACT

Disclosed is an information processing device suited to enhancing a usability by simplifying the inputting, etc., of user authentication information while assuring data confidentiality. A retaining means 301 retains information showing whether or not there has already been performed an initial authentication, executed upon accessing for the first time a function providing party for providing a cabinet function with authentication. An acquiring means 303, if such initial authentication has been done judging from the information within the retaining means 303, acquires authentication information when making the initial authentication. A setting means 305, if the initial authentication has been done, sets the authentication information acquired by the acquiring means 303 as authentication information for using the cabinet function this time.

8 Claims, 9 Drawing Sheets

INFORMATION PROCESSING DEVICE, INFORMATION PROCESSING SYSTEM, AUTHENTICATION METHOD, STORAGE MEDIUM AND PROGRAM

BACKGROUND OF THE INVENTION

1. Field of the Invention

The present invention relates to an information processing device, an information processing system, an authentication method, a computer readable storage medium storing a program for carrying out the authentication method, and the program itself that are used for an application having a security function capable of setting, e.g., a user password for every cabinet and for a user authentication function of an operating system or of a device.

2. Related Background Art

A "cabinet" for efficiently retaining and managing data has hitherto been provided in, for example, a digital complex device having a function of scanning a text and retaining the text data in a storage area within the device and in a file system structured to retain and manage the text data and files by booting a predetermined processing program on a computer.

The cabinet is also referred to as a box or a folder, etc., and can be regarded as a logical data storage area having an arbitrary directory structure.

Further, the cabinet is structured so that user authentication information (which will hereinafter simply be also termed "authentication information") can be set per cabinet in order to assure the confidentiality of the data to be retained and managed in the cabinet.

In a device or system including the cabinet, however, the user is, when utilizing the cabinet, required to input the authentication information each time the user utilizes (accesses) the cabinet, and to store a plurality of different pieces of authentication information for every cabinet.

Such being the case, for obviating problems derived from the time-consuming operations described above, there were contrived, for instance, a method of taking an operational solution such as using the authentication information set for the cabinets in a way that unifies these pieces of authentication information in all the cabinets, and a method of utilizing a technique known as so-called single sign-on (SSO).

For example, according to the method utilizing the single sign-on technique, the user inputs the authentication information once and is enabled to, after the user authentication has been performed, access the cabinet in which the same authentication information is set without again inputting the authentication information. With this scheme, the user can omit the time-consuming procedure of inputting the authentication information for every cabinet and has no necessity of storing plural pieces of authentication information. Accordingly, the usability for the user can be enhanced.

In the conventional device or system having the cabinet described above, however, if the operational solution of unifying the authentication information set for the cabinets is adopted, then if an operation rule is required to be thoroughly known by all the users enabled to set the authentication information for the cabinets, then the need to know this additional information reduces the improvement in usability in spite of the unified authentication information. In addition, the unified authentication information is set for all the cabinets, and hence it is difficult to assure the confidentiality of the unified authentication information, resulting in a problem that confidentiality of the contents of the cabinets is substantially degraded.

On the other hand, for applying the SSO technique, the device or system such as the existing and already-introduced-to-the-user digital complex device or file system having the cabinet, cannot be utilized as it is and needs to be replaced with a newly-developed model or a new version in order to be adapted to the device or system utilizing the predetermined SSO technique. The introduction of the above-mentioned new model or new version imposes a new burden in terms of cost and management extensively as well upon the user.

For example, it is generally difficult to transfer the setting of the authentication information in the device or system such as the existing digital complex device or file system having the cabinet, and it follows that the user is forced to perform time-consuming operations such as resetting the authentication information and transferring the data retained and managed in the cabinet.

Further, a design of the device or system such as the digital complex device or file system having the cabinet, depends on specifications of the device or system to which the specified SSO technique is applied, and it is therefore difficult to provide the user with flexible product specifications.

SUMMARY OF THE INVENTION

Under such circumstances, it is an object of the present invention, which was devised to obviate the defects described above, to provide an information processing device, an information processing system, an authentication method, a computer readable storage medium storing a program for carrying out the same authentication method and also the program itself, that are suited to enhancing usability by simplifying an input operation, etc., of user authentication information while assuring the confidentiality of data.

In addition, it is another object of the present invention to provide an architecture for providing a function (single sign-on function) using a single sign-on technique in linkage with a device or system having an existing authentication function in a network environment of the user.

To accomplish the above objects, according to an aspect of the invention, an information processing device capable of accessing a function providing party for providing a use of a cabinet function with authentication, has a retaining unit for retaining information showing whether initial authentication of the cabinet function has already been done or not, an acquiring unit for acquiring authentication information when making the initial authentication if the initial authentication has already been done based on the information in the retaining unit, and a setting unit for setting, if the initial authentication has already been done based on the information in the retaining unit, the authentication information acquired by the acquiring unit as authentication information for using the cabinet function this time.

In the information processing device according to the first aspect of the invention, the acquiring unit decrypts the authentication information encrypted. In the information processing device according to the first aspect of the invention, the acquiring unit acquires the relevant authentication information on the basis of user information and access target cabinet information.

According to a second aspect of the invention, an information processing system for managing in unity user authentication information registerable per cabinet, has a function providing computer unit for providing an authenticated cabinet function to a user, a server computer unit having a directory function of managing user authentication information in unification as a database, searching for information in response to a query from the user, and sending a result of the search as a response to the query back to the user, an authentication server computer unit for authenticating the user, and a user computer unit including a function of executing user authentication in a way that connects to the authentication server computer unit, a function provided for the user to perform an operation with respect to a cabinet, and a user interface.

In the information processing system according to the second aspect of the invention, the user computer unit includes a function of recognizing the cabinet designated by the user and acquiring an identification name of this cabinet, a user interface function provided for the user to input initial authentication information designated for the first time in order to use the cabinet, an initial authentication function of authenticating the user by use of the initial authentication information in a way that connects to the authentication server computer unit, a retaining function of retaining the initial authentication information as user authentication information unique to the user for a predetermined effective period of time, an encrypting/decrypting function of encrypting/decrypting the user authentication information on the basis of a predetermined encryption algorithm, a searching/acquiring function of searching for and acquiring the user authentication information encrypted with respect to the cabinet from the server computer unit, and an input function of inputting the user authentication information as authentication information of a predetermined cabinet in the function providing computer unit.

In the information processing system according to the second aspect of the invention, the initial authentication information is used as unique authentication information necessary for the user to be authenticated by the authentication server computer unit, and is also used for a process of decrypting the encrypted user authentication information related to the cabinet.

In the information processing system according to the second aspect of the invention, the user authentication information is encrypted based on the initial authentication information of the user by the encrypting/decrypting function, and is retained on the directory server unit in a way that relates the encrypted initial authentication information to the cabinet designated by the user or to the user identification information.

In the information processing system according to the second aspect of the invention, the authentication server computer unit is any one of a file server, a mail server, a schedule management server and a database server, or has a function as a server integrated with any one of the server functions, and also has a function of authenticating the user for the purpose of permitting the user to use the function concerned.

In the information processing system according to the second aspect of the invention, the user computer unit uses LDAP (Lightweight Directory Access Protocol) as a protocol for searching for and acquiring the information from the server computer unit and as a standard directory control protocol.

In the information processing system according to the second aspect of the invention, the user computer unit and the function providing computer unit are structured as physically indispensable devices existing as partial functions, and these two partial functions have such an architecture as to perform information communications based on a logical data exchange method in their interiors.

According to a third aspect of the invention, an authentication method for enabling a user to use a cabinet requiring authentication by use of user authentication information in a way that manages in unity the user authentication information registerable per cabinet, has a step of judging that user authentication in authentication server unit has already been completed, a step of judging a result of user initial authentication, a step of judging an end of the use of the cabinet, and an end processing step.

The judging process of judging that the user authentication in the authentication server unit has already been completed, includes a step of acquiring a profile described about authentication information of the cabinet, and a step of judging a status where the user authentication in the authentication server unit has already been completed, and, if the authentication has already become successful as a result of the judgement, enabling the user immediately to start using the cabinet on the basis of the contents of the profile without executing the user authentication in the authentication server unit. The step of judging the result of the user initial authentication, includes a step of authenticating the user by connecting to the authentication server unit, and a step of judging a result of the user initial authentication in the authentication server unit and, if the authentication fails, executing the authentication again. The step of judging the end of the user of the cabinet, includes a step of enabling the user to use the cabinet, and a step of acquiring again, if the user consecutively uses the cabinet as a result of judging that the user finishes using the cabinet, a profile of the cabinet concerned. The end processing step includes a step of discarding the user initial authentication information and the user authentication status retained if the user finishes using the cabinet as a result of the judgment in the step of judging the end of the use of the cabinet.

The authentication method according to the third aspect of the invention further has a step of connecting to the authentication server unit and executing the user authentication in order to perform the user initial authentication before the user uses the cabinet.

In the authentication method according to the third aspect of the invention, the step of enabling the user to use the cabinet includes a step of acquiring an identification name of the cabinet accessed by the user, a step of searching for the encrypted user authentication information with the user and the cabinet identification name used as keys and thus acquiring the encrypted user authentication information, a step of decrypting the encrypted user authentication information on the basis of a predetermined encryption algorithm with the user initial authentication information used as an encryption key, and a step of enabling the user to use the cabinet by inputting the user authentication information to an authentication interface of the corresponding cabinet.

According to a fourth aspect of the invention, a computer readable storage medium is recorded with a program for making a computer actualize the function of the information processing device according to the first aspect of the invention, or the function of the information processing system according to the second aspect of the invention.

According to a fifth aspect of the invention, a computer readable storage medium is recorded with a program for making a computer execute the processing steps of the authentication method according to the third aspect of the invention.

According to a sixth aspect of the invention, there is provided a program for making a computer actualize the function of the information processing device according to the first aspect of the invention, or the function of the information processing system according to the second aspect of the invention.

According to a seventh aspect of the invention, there is provided a program for making a computer execute the processing steps of the authentication method according to the third aspect of the invention.

According to an eighth aspect of the invention, an information processing device has a function of the information processing device according to the first aspect of the invention, and this function acquires a relevant piece of authentication information from a predetermined storage area in a program preloaded into a storage area on a computer. To be specific, for example, the system utilizing the present invention for managing in unity the user authentication information registerable per cabinet, is constructed of a function providing computer for providing the user with a cabinet function with authentication and an application function (which will hereinafter also be called a "cabinet, etc.") requiring the user authentication, a server computer (which will hereinafter also be termed a "directory server") having a directory function of managing the user authentication information in unification as a database, searching for the information in response to a query from a client, and sending a result of the search as a response to the query back to the client, and a user computer having a user interface function provided for the user to input a necessary piece of initial authentication information, a function of executing an encrypting/decrypting process of the user authentication information on the basis of a predetermined encryption algorithm, a function of retrieving/acquiring the user authentication information for the cabinet, etc., by use of a standard directory control protocol from the directory server or retaining the same information, and, in addition, a function of inputted the decrypted user authentication information as authentication information of the predetermined cabinet, etc.

The user computer and the function providing computer described above have such an architecture that these two computers exist physically independently of each other and perform information communications through a standard network communication protocol, and are structured as physically indispensable devices existing respectively as partial functions, and these two partial functions are such as to perform the information communications based on a logical data exchange method in their interiors as the case may be. On the other hand, the directory server and the user computer execute the information communications through the standard network communication protocol.

Further, for making the initial authentication of the user, the user computer includes a unit for executing not the authentication in the directory server but the user initial authentication by communicating with the existing other authentication system. Moreover, the user computer includes a unit for recognizing which cabinet, etc., the user has designated in order to specify the user authentication mapping to the cabinet, etc.

The initial authentication information inputted by the user using the user interface function is provided for the user to utilize the present system and is internally stored on the user computer for a period during which the user in the present system keeps an effective authority for the use thereof. Further, the initial authentication information is utilized in common for decrypting the encrypted user authentication information for the cabinet, etc.

The user authentication information, etc., retained on the directory server is so structured (logical structure) as to be stored per user in a way of mapping to an ID for specifying the cabinet, etc., and user authentication information for the cabinet, etc.

On the other hand, there may be taken a structure in which the user and the user authentication information for using the cabinet, etc., are stored per directory object for specifying the cabinet, etc., in a way that maps (relates) the user and the user authentication information to each other.

On the other hand, there is a scheme according to which the user authentication information, etc., retained on the directory server may be stored in a predetermined storage area on the user computer. In this case, the user authentication information for the cabinet is acquired not from the directory server but internally from the predetermined storage area on the user computer. Note that the processing procedure and other characteristics in the scheme for acquiring the user authentication information from the predetermined storage area on the user computer concerned, can be conceived the same as for acquisition from the directory server.

According to the architecture described above, in the present system, the original user authentication information set per cabinet is respectively encrypted based on the predetermined encryption algorithm and then stored in the predetermined area on the directory server. When the user accesses the cabinet in order to use this cabinet, the user computer searches for the user authentication information for this cabinet from the directory server, thus acquiring the user authentication information.

At this stage, the user authentication information is encrypted beforehand, however, the encrypted user authentication information for the cabinet can be decrypted by use of the initial authentication information inputted previously to the user computer in the authentication needed for the user to utilize the present system.

The decrypted user authentication information for the cabinet is inputted by the function of the user computer to the authentication mechanism for the cabinet accessed by the user. Thereafter, the user is enabled to access and utilize the cabinet.

A series of these processes in the user computer are internally automated, and the initial authentication information is retained on the user computer during the predetermined effective period. Therefore, the user simply inputs the initial authentication information for utilizing the present system once for the first time, and is enabled to access a desired cabinet without inputting afresh the user authentication information for the cabinet in the function providing computer.

Further, on the occasion of implementing the initial authentication of the user, the authentication can be done by communicating not with the directory server but with the existing authentication server, whereby the usability to the user can be more enhanced.

Other objects and features of the present invention will become apparent from the following specification and the accompanying drawings.

DETAILED DESCRIPTION OF THE PREFERRED EMBODIMENTS

Embodiments of the present invention will hereinafter be described with reference to the accompanying drawings.

Figure 1:
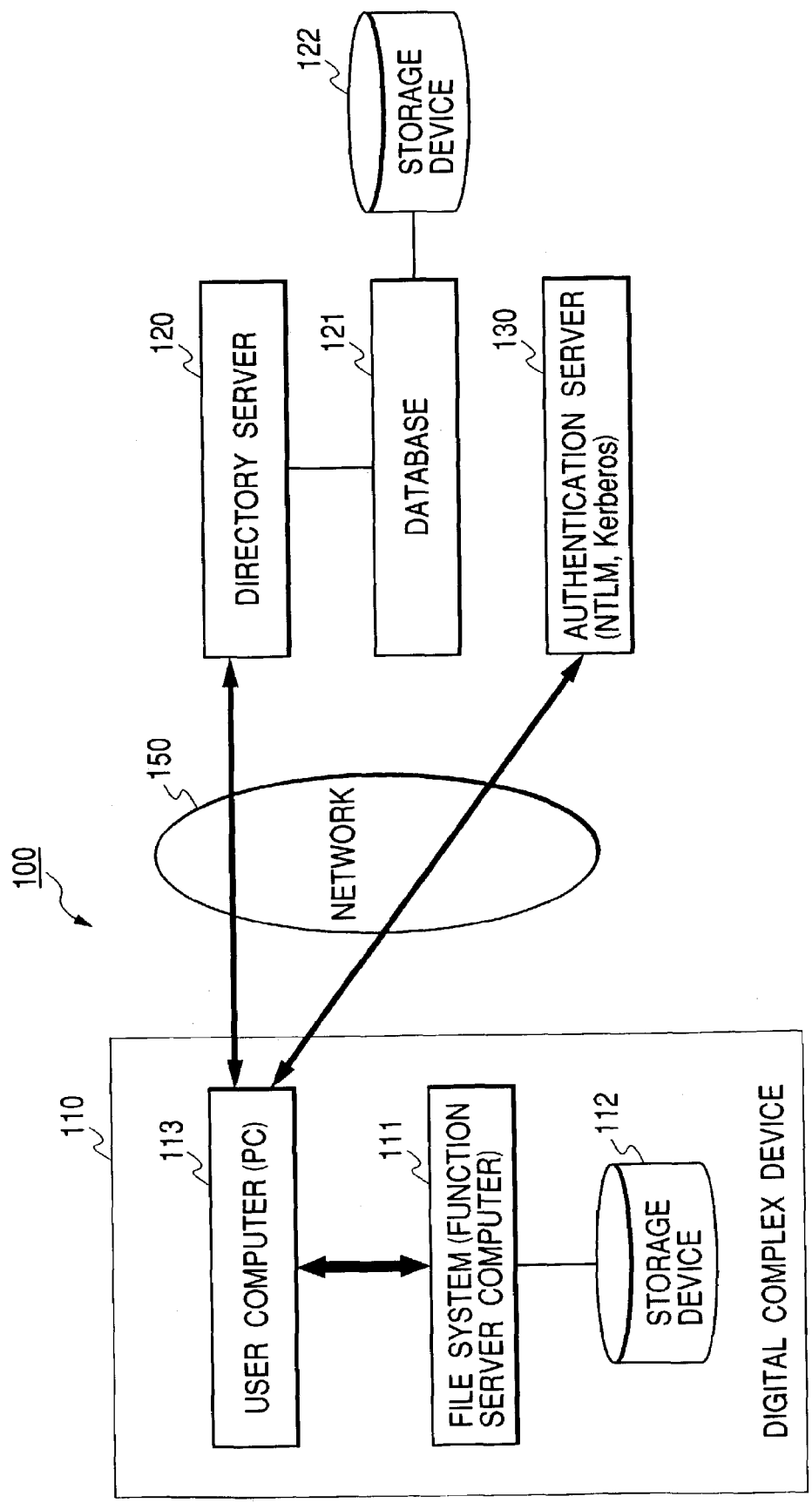
FIG. 1 is a block diagram showing an architecture of a network system to which the present invention is applied.

The present invention is applied to, for example, a network system 100 as shown in FIG. 1.

The network system 100 in this embodiment has a characteristic architecture for managing user authentication information used when a user utilizes an arbitrary cabinet in a file system 111.

The architecture and operations of the network system 100 in this embodiment will hereinafter be specifically described.

<Overall Architecture of Network System 100>

The network system 100 has, as illustrated in FIG. 1, such a topology that a user computer 113 such as a personal computer, etc., which has access to a file system 111 to which a storage device 112 is connected, a directory server 120 that has access to a database 121 to which a storage device 122 is connected, and an authentication server 130 are so connected as to be able to communicate with each other via a network system 150.

The file system 111 logically creates a plurality of cabinets for saving data such as texts, etc., and retains these cabinets.

To be specific, for instance, the file system 111 creates substances of the cabinets in predetermined storage areas on the storage device 112. Accordingly, it follows that data in these cabinets are saved in the storage device 112.

The file system 111 and the storage device 112 are physically connected to each other by a predetermined signal line.

The substances providing functions of the file system 111 are actualized by software that can be booted on, e.g., a general-purpose computer (personal computer: PC). In this embodiment, the file system 111 is a function server computer.

The user computer 113 provides a necessary user interface (UI) to a user of the file system 111, and is at the same time a PC on which a user computer means as one of system configuring means of the present invention is embodied.

The user computer means is actualized as software running in a way that resides in a predetermined storage area on the user computer 113.

Note that the PC in this embodiment is, though explained in detail later on with reference to the drawings, constructed of a CPU, a ROM, a RAM (a primary storage device), an I/O device, a hard disk (a secondary storage device), input/output (I/O) devices (a CRT, a keyboard and a mouse) and a system bus for connecting these component to each other. the CPU loads the software stored on the ROM or the hard disk into a predetermined memory space and executes the software, thereby controlling the I/O device and so forth. With this scheme, the respective functions in this embodiment are carried out.

Herein, FIG. 1 illustrates an architecture in which a digital complex device 110 includes, as indicated by the broken line, the user computer 113, the file system 111 and the storage device 112. This is not limited to an architecture in which each of the user computer 113, the file system 111 and the storage device 112 exists as a single substance, and exemplifies an embodiment wherein the user computer 113, the file system 111 and the storage device 112 exist respectively as function modules, and the whole of this module suite indicated by the broken line is constructed as an integral device or system.

In this case, the file system 111 and the storage device 112 correspond to function server computer means in the configuring means of the present invention, and the user computer 113 corresponds to a user computer means in the configuring means of the present invention.

The authentication server 130 is a server for making initial authentication of the user.

What is given as a form requiring the authentication is, for example, a form of authenticating a user's participation in a predetermined domain, a form of authenticating a use of a predetermined database server, and so on. For instance, the form of authenticating the user's participation in the predetermined domain exemplifies a log-in to, e.g., a "Windows®" domain configured by a "Windows®" server and a "Windows® 2000" server, and the form of authenticating the use of the predetermined database server exemplifies user authentication in a Lotus Domino server.

Accordingly, the user computer 113 is connected to the authentication server 130 via the network 150 and executes authentication of the user on the basis of predetermined protocols.

The predetermined protocols herein may involve utilizing systems as they are, which are supported by the authentication server 130. This scheme enables the existing network environments to be utilized directly. Examples of such predetermined protocols are the NTML authentication protocol, the SSL (Secure sockets Layer) protocol involving the user of a digital signature, the Kerberos authentication protocol and so forth.

The directory server 120 corresponds to a part of the server computer means according to the present invention, and provides an LDAP (Lightweight Directory Access Protocol) server function as a control protocol of the directory server.

The LDAP is defined as a standard directory access protocol developed by the IETF (Internet Engineering Task Force) Working Group (WG) so as to function as a lightweight front end with respect to the X.500 directory access protocol of the OSI (Open System Interconnection) model, and specification of the LDAP are defined by RFC1777, RFC2251, etc.

The database 121 functions as a back end of the directory server 120 and handles various categories of directory objects in the form of databases. Substances of the directory objects are herein retained on the storage device 122 connected to the database 121.

What is exemplified as a protocol for communications between the directory server 120, the authentication server 130 and the user computer 113, is a standard network communication protocol such as TCP/IP (Transmission Control Protocol/Internet Protocol) and so forth. The LDAP operates, as an application layer protocol, on the network communication protocol.

Note that for instance, "Active Directory Server" and "Novel Directory Service" available as commercial products for providing the directory server function, or "Open LDAP" distributed as an open source, can be applied as the directory server 120, the database 121 and the storage device 122.

<Cabinet in File System 111>

To start with, the cabinet might be called a box, a folder, etc., and can be conceived as a logical data storage area having an arbitrary directory structure. Further, the cabinet has a logical hierarchical structure for efficiently retaining and managing various categories of data such as texts, user data, etc. Moreover, the cabinet is structured so that user authentication information (authentication information) can be set in every cabinet in order to ensure the confidentiality of the data retained and managed in the cabinet.

A method of designating a name (cabinet name) given to a desired cabinet is generally used as a method of specifying the cabinet. The cabinet specifying method is not, however, limited to this method and can involve the used of, e.g., a method of specifying the cabinet with an ID in a way that retains in the software a value of the ID for specifying the cabinet. This method is effective in flexibly changing the cabinet name later on.

Figure 2:
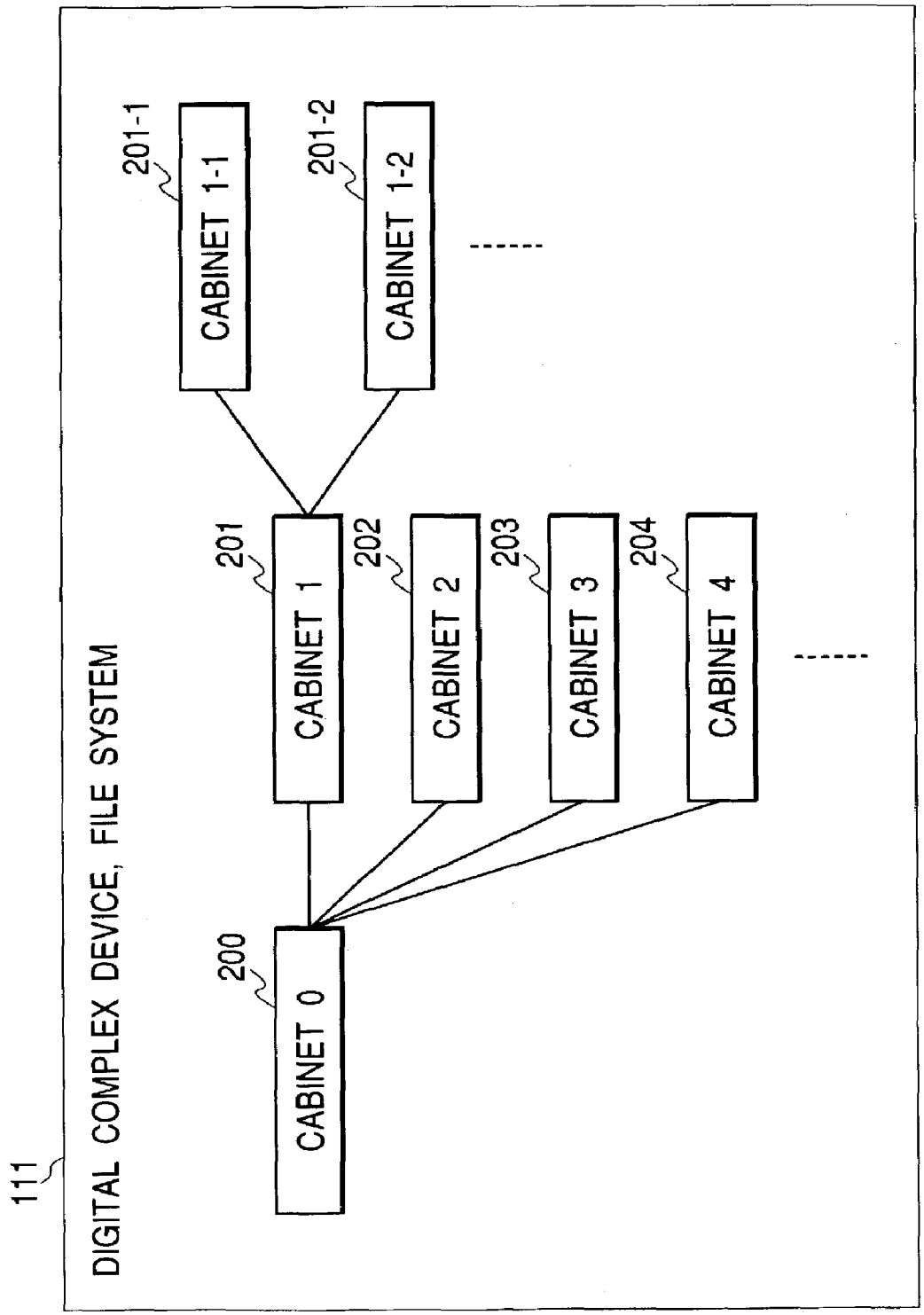
FIG. 2 is an explanatory diagram showing a structure of cabinets in a file system in the network system.

FIG. 2 shows one example of the cabinet structure provided by the file system 111.

Referring to FIG. 2, a cabinet 0(200) is defined as a root cabinet area. An interior of the cabinet 0(200) can be further provided with a plurality of cabinets such as a cabinet 1(201), a cabinet 2(202), a cabinet 3(203), a cabinet 4(204), . . . .

The user assigns significance, taking usability into consideration, to each of these cabinets 0(202), 1(201) through 4(204), . . . , whereby data such as texts, images, etc., can be saved.

Further, the cabinets 1(201), 2(202), 3(203), 4(204), . . . are each structured to enable the cabinet to be multi-hierarchized.

For example, the interior of the cabinet 1(201) can be provided with cabinets 1-1(201-1) and 1-2(2012).

The cabinet structure as shown in FIG. 2 can be arbitrarily set by the user. Namely, the user utilizing the file system 111 is able arbitrarily to determine what logical structure of the cabinet in the file system 111 is taken.

The user authentication information related (mapping) to each cabinet described above is retained in each cabinet, as internal logical information of the file system 111 in this embodiment.

For example, in the cabinet structure shown in FIG. 2, the user authentication information necessary for accessing the cabinet 0(200) is retained mapping to every user as information incidental to the cabinet 0(200).

The information mapping to every user, in addition to the user authentication information, has incidental pieces of information on the authority of that user and so on as the case may be. In this case, access to the cabinet by a certain user can be controlled finely, corresponding to categories of operation such as reading, writing, executing, etc. The user authentication information incidental to the cabinet can be set in every cabinet, and hence this structure is effective in a case where the system handles data of high confidentiality.

Note that the cabinets may differ in terms of restriction of the hierarchical structure, structure of an authentication control list, etc., but the digital complex device also has the same function.

<Architecture of User Computer 113>

Figure 3:
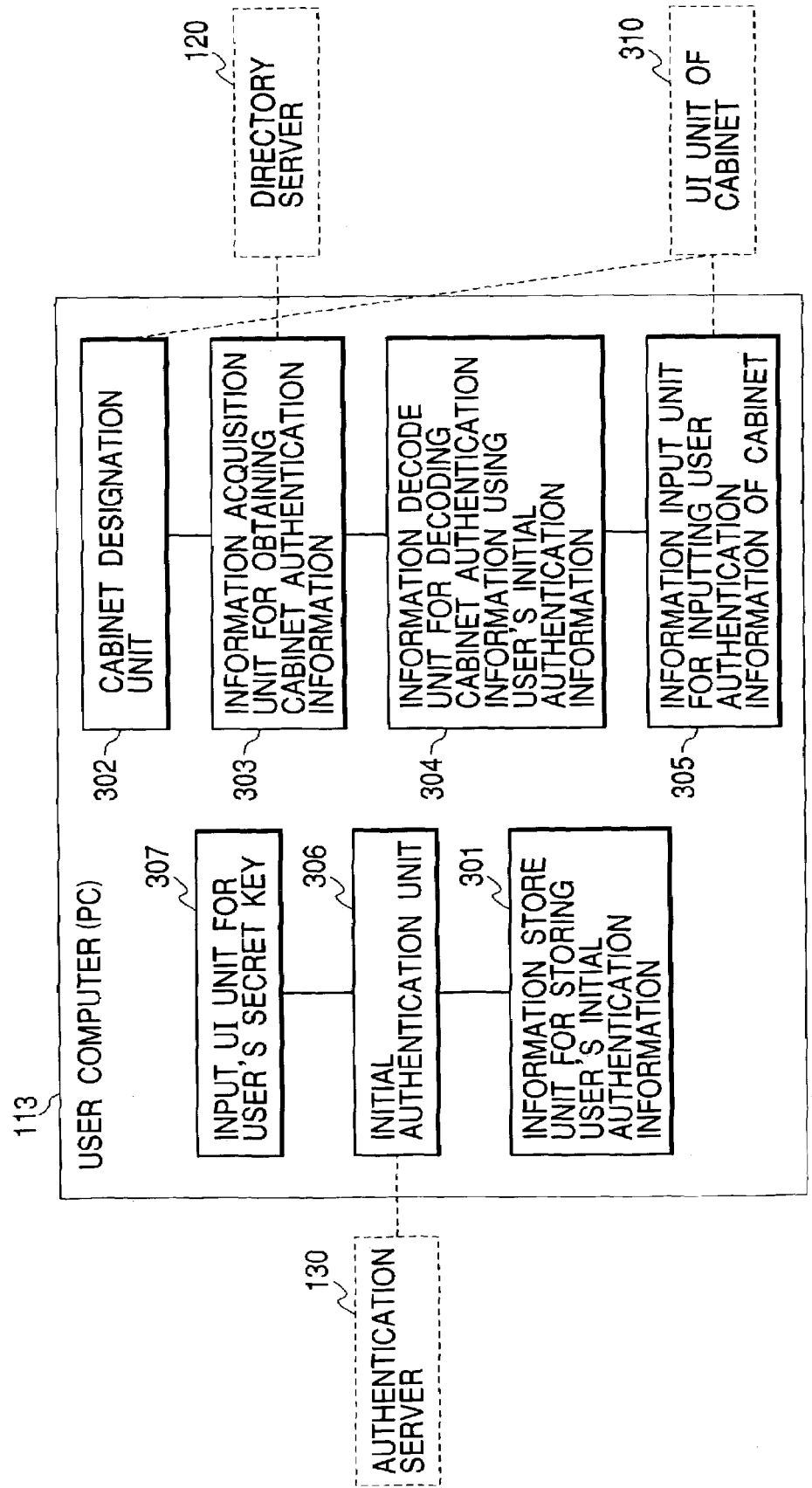
FIG. 3 is a block diagram showing an architecture of a user computer in the network system.

FIG. 3 specifically shows a characteristic architecture of the user computer 113.

The user computer 113 includes, as shown in FIG. 3, a UI unit 307 for inputting a user's secret key, an information store unit 301 for storing initial authentication information of the user, a cabinet designation unit 302, an information acquisition unit 303 for obtaining the authentication information for the cabinet, an information decode unit 304 for decoding (decrypting) the cabinet authentication information by use of the user's initial authentication information, and an information input unit 305 for inputting the user's authentication information for the cabinet.

The UI unit 307 provides a function of inputting the initial authentication information for the user to utilize the file system 111.

To be specific, for instance, the UI unit 307 provides a function (log-in function) corresponding to an action called a log-in to the system. This is a process required when the user utilizes the file system 111 for the first time. The UI unit 307 displays, as the log-in function, a dialog box for inputting the authentication information on a display (unillustrated) provided on the user computer 113, then prompts the user to input the authentication information, and captures the information inputted by the user as a piece of initial authentication information.

The initial authentication unit 306 provides a function of helping the user execute the use of the file system 111.

Specifically, for example, the initial authentication unit 306 accesses the authentication server 130 and performs the initial authentication of the user by use of the user's initial authentication information acquired from the UI unit 307.

At this time, the initial authentication unit 306 controls ON/OFF (display/non-display) of information display in the UI unit 307. Namely, if the user participates in a domain after the user's authentication has already been finished, the initial authentication unit 306 continues the processing on the assumption that the user concerned has already undergone the normal authentication without displaying the UI unit 307 afresh. In contrast, if the user is not yet participating in the domain, the initial authentication unit 306 displays the UI unit 307 anew, thereby authenticating the user concerned.

Herein, if the authentication server 130 is a Lotus Domino server, and if the user boots and uses a Lotus Notes client on the user's own PC (the user computer 113), the initial authentication unit 306 continues the processing, on the assumption that the user has undergone the authentication in the normal way, without displaying the UI unit 307 afresh. On the other hand, if the user does not boot the Lotus Notes client on the user's own PC (the user computer 113), the initial authentication unit 306 displays the UI unit 307 anew, thereby authenticating the user concerned.

The initial authentication unit 306 actualizes the series of processes described above by use of, e.g., "Windows®" and a predetermined API (Application Program Interface) function provided by the Lotus Notes application. For instance, the initial authentication unit 306 uses an API for obtaining a name of the domain to which the user logs in, an API for performing the log-in to the domain, and so forth.

When the initial authentication of the user has been completed by the initial authentication unit 306, the initial authentication information inputted by the user through the UI unit 307 is stored in safety within the user computer 113 over a predetermined period for which the user concerned keeps the authority.

For example, a period ending when the user logs out, and starting when the user finished using the file system 111, may be given as the predetermined period described above.

Further, a structure for storing the initial authentication information in safety corresponds to the structure of the information store unit 301. Namely, the information store unit 301 caches, in the storage area within the user computer 113, the information in a format operable only by the user computer 113. The user's initial authentication information herein stored is used when decrypting the encrypted authentication information for the cabinet, which will hereinafter be described later on.

The cabinet designation unit 302 operates in cooperation with a user interface (UI) unit 310 that will be explained later on, then recognizes the cabinet designated by the user of the file system 111, and obtains the name of this cabinet.

The UI unit 310 provides the user of the file system 111 with a function of the user interface (UI) unit 310 that is required for operating the file system 111.

Accordingly, the user performs, on the UI unit 310, an operation of designating a desired cabinet, from among the cabinets created by the file system 111, in order to access this desired cabinet.

When designating (specifying) the cabinet, a name of this cabinet is used, but this cabinet name is needed also for acquiring the user authentication information mapping to this cabinet.

Note that while the cabinet name is used for specifying the cabinet in this embodiment, the cabinet specifying element is not limited to the cabinet name, and other types of ID related to the cabinet concerned may also be used. The selection of which method is used, depends on how the cabinet is structured in the file system 111 and how the plurality of cabinets are managed, and it is preferable to select a highly efficient method in terms of design.

The information acquisition unit 303 acquires the concerned user authentication information from the directory server 120 on the basis of a name of the user logging in to the file system 111 and the cabinet name obtained by the cabinet designation unit 302.

As described above, the directory server 120 is structured to support the LDAP, and therefore the information acquisition unit 303 has a function as an LDAP client and acquires, based on the LDAP, the relevant user authentication information from the directory server 120.

The user authentication information acquired by the information acquisition unit 303 from the directory server 120 is in a status of being encrypted based on a predetermined encryption algorithm with the user-by-user basis authentication information used as a key.

The information decode unit 304 has a function implemented by booting a software program containing a predetermined encryption processing engine, and is structured to be capable of executing the encryption processing and decryption processing of the user authentication information.

Accordingly, the information decode unit 304 decodes (decrypts) the encrypted user authentication information by use of the user's initial authentication information stored in safety by the initial authentication unit 306 within the user computer 113.

In the information decode unit 304, a variety of existing encryption algorithms can be applied as the encryption algorithm supported by the encryption processing engine, and it is herein assumed that an arbitrary algorithm is preset.

Further, the scheme is that the encryption processing and decryption processing of the data are executed by only the user computer 113, and hence it does not happen that the user's encryption key flows on the network 150. It is therefore possible to avoid problems such as stealing of the user's encryption key by unlawful wiretapping of the network 150 and so on.

The information input unit 305 inputs to the UI unit 310 the user authentication information decrypted by the information decode unit 304.

Namely, according to the prior art, the user interface is structured of the dialog box, etc., for inputting the authentication information, where the user manually inputs the user authentication information per cabinet into this dialog box. The information input unit 305, however, surrogates inputting the user authentication information by automatically hooking the dialog box. Accordingly, the input processing of the user's authentication information for the cabinet is in this way automated, and thus the user has no necessity of performing the input operation.

Herein, a scheme can be adopted by way of another embodiment, where the information acquisition unit 303 acquires the relevant user authentication information not from the directory server but from a predetermined storage area on the user computer 113 concerned. That is, the user authentication information mapping to the cabinet is acquired internally from the predetermined storage area on the user computer 113, which is preloaded with the same information together with the program. In this case, the user authentication information is processed only within the storage area on the user computer 113, and the data never flow outside the computer as in the case of accessing the directory server 120. Accordingly, the user authentication information need not be encrypted, and the information input unit 305 immediately executes inputting of the user authentication information to the cabinet.

According to this embodiment as discussed above, the series of sequences such as the search, the acquisition, the decryption processing and the input to the dialog box with respect to the user's authentication information for the cabinet, is automated, and hence the user is released from the user's operation of inputting the user's authentication information for the cabinet.

Further, the inputting of the user authentication information is automatically effected at the back end of the user computer 113, and hence the user has no necessity of storing the unique user authentication information set in every cabinet.

Namely, the user, on the occasion of utilizing the file system 111, simply accesses the want-to-use cabinet after inputting the initial authentication information and then being authenticated. Thereafter, the user computer 113 automatically inputs the user's authentication information for the cabinet, thereby enabling the user to access the cabinet.

Further, as in the case of the user's having already participated in the domain through the domain authentication, when the user authentication has been completed, the user is not required to input the user's initial authentication information afresh on the occasion of utilizing the file system 111. In this case, the file system 111 operates in cooperation with the existing authentication system, and it is therefore expected that the usability will be more enhanced.

Note that the authentication server 130, the directory server 120 and the cabinet UI unit 310 are indicated by broken lines, and the connecting lines extending from these broken lines represent relationships between the respective components 301 through 307 included in the user computer 113 in FIG. 3.

Moreover, the solid straight lines connecting these components 301 through 307 to each other represent relationships between the respective components 301 through 307.

Furthermore, referring again to FIG. 3, the component area encompassed by the solid line as the user computer 113 does not imply that the thus-encompassed component area independently exists on the computer. There might be a case where other components such as the cabinet UI unit 310 operate together with the respective components of the user computer 113 physically on the same computer.

<Function of Directory Server 120>

Given herein is an explanation of a fixed rule (which will hereinafter be also termed a "schema") for assuring compatibility between the user authentication information stored on the database 121 by the directory server 120 and the user authentication information managed by the directory server 120.

As discussed above, the user authentication information is the user's authentication information for the cabinet in the file system 11 and is the information that the user must input in order to access the cabinet.

The scheme is not that the user authentication information is retained as its format remains intact on the directory server 120 but that the user authentication information is, after being encrypted based on the predetermined encryption algorithm, transmitted to and retained on the directory server 120.

This scheme prevents a different user having an authority of comprehensively managing the directory server 120 from unlawfully referring to the user authentication information retained per user on the directory server 120. Since the administrator of the directory server 120 is not necessarily identical with the administrator (or the user) of the file system 111, the above scheme helps to eliminate the possibility of unlawful wiretapping of the user authentication information for accessing the cabinet in the file system 111.

Herein, for simplifying the following discussion, cabinet names for specifying cabinets X (X: 0, 1, 2, 3, ...) as shown in FIG. 2 are expressed by "CabinetX", while the user authentication information of a user Y mapping to the cabinet X is expressed by "passYX". Further, "Ek(M)" represents that information M is encrypted by an encryption key k.

Accordingly, for instance, the user authentication information of the user 1 set for the cabinet 1 is expressed by "pass11", and the encryption of "pass11" using the encryption key k1 of the user 1 is expressed by Ek1 (pass11).

Further, an implication that the user authentication information mapping to the cabinet 1 is set mapping to the name "Cabinet1" for specifying the cabinet 1, is expressed such as:

Ek1 (pass11): Cabinet 1

According to this embodiment, "cabinetPerson" implying a class of the user (user class) who uses the cabinet is defined as a schema in the directory server 120. Further, the user class has an attribute "encryptedPass" defined as a value with which the encrypted user authentication information is set mapping to the cabinet.

The following is an exemplification of an object class and an attribute by use of a directive defined in RFC2252:

objectclass (1.1.2.2.1 NAME 'cabinetperson'
  DESC 'cabinet user'
  SUP person STRUCTURAL
  MUST ('encryptedPass'))

attributetype (1.1.2.1.1 NAME 'encryptedpass'
  DES 'encrypted password for cabinet'
  SYNTAX 1.3.6.1.4.1.1466.115.121.1.40)

Such being the case, according to this embodiment, the user authentication information is stored mapping to the cabinet per user on the directory server 120 by use of the schema defined above.

Figure 4:
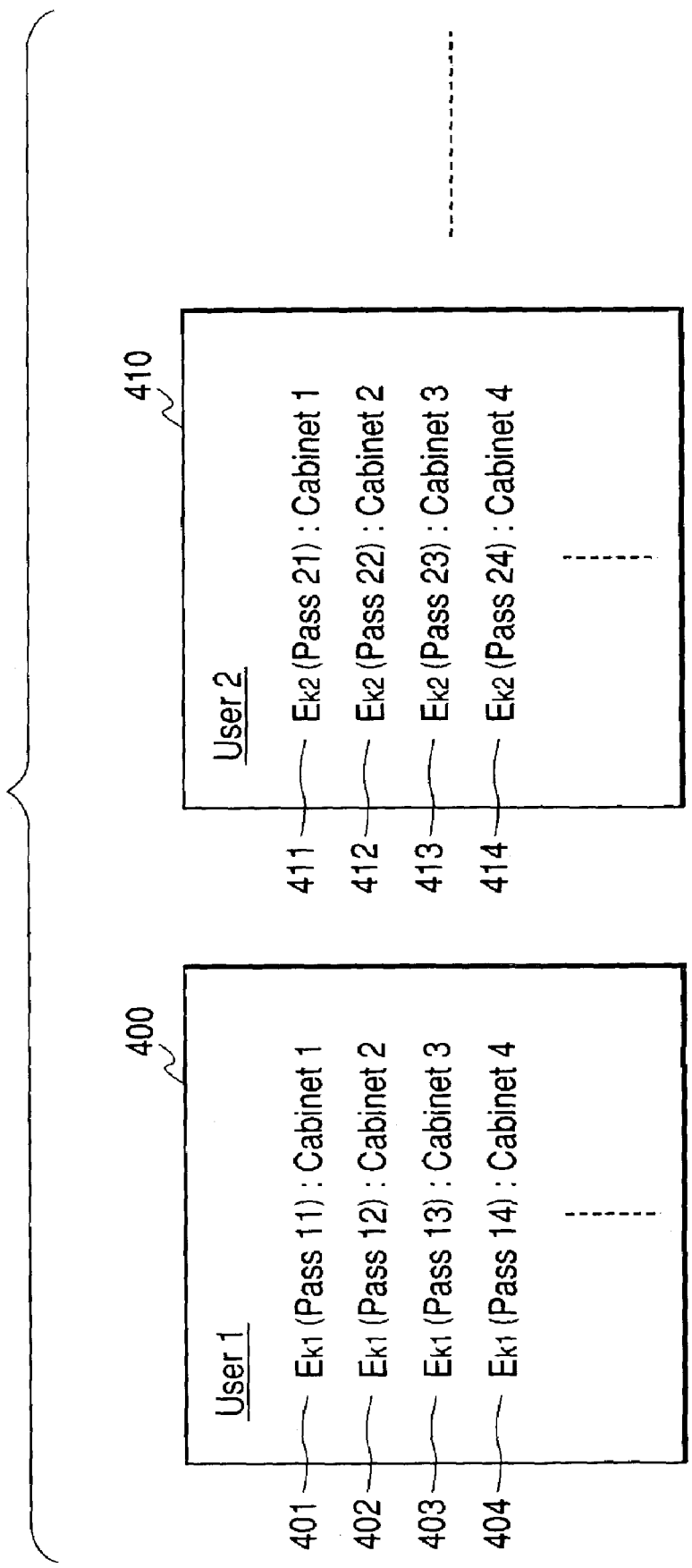
FIG. 4 is an explanatory diagram specifically illustrating a definition of a schema in a directory server in the network system.

FIG. 4 shows a structure of pieces of information stored for every user on the directory server 120.

Referring to FIG. 4, User1 (400) and User2 (410) are respectively objects defined by "cabinetPerson" class (user class).

Each of the objects User1 (400) and User2 (410) has, as an attribute "encryptedPass", the encrypted user authentication information mapping to every cabinet. To be specific, the object User1 (400) has a piece of encrypted user authentication information 401 mapping to Cabinet1 (201), a piece of encrypted user authentication information 402 mapping to Cabinet2 (202), etc. the object User2 (410) similarly has user authentication information 411, user authentication information 412, etc.

The user authentication information 401 (Ek1 (pass11): Cabinet1) as one of the attributes "encryptedpass" possessed by the object User1 (400), implies that the User1 sets "pass11" as the user authentication information mapping to Cabinet1 (201), this piece of user authentication information is encrypted by the encryption key k1 of the User1, and the user authentication information after being encrypted is retained mapping to the Cabinet1 on the directory server 120.

On the other hand, the user authentication information 411 (Ek2 (pass21):Cabinet1) as one of the attributes "encryptedpass" possessed by the object User2 (410), implies that the user authentication information "pass21" set in the Cabinet1 (201) has undergone the encryption processing by use of the encryption key k2 of the User2.

Hence, the User1 is unable to acquire and encrypt the user authentication information mapping to the cabinet of the User2, whereby the data confidentiality can be enhanced.

The objects (User1 (400) and User2 (410), etc.) defined in the "cabinetPerson" class are able to dynamically change in accordance with a registration state of the users. Further, the encrypted user authentication information, i.e., the "encryptedpass" attribute, mapping to every cabinet changes corresponding to the registration state of the cabinets utilized by the users having this attribute.

Note that the user registration and the setting about the access to the cabinet are done beforehand for the file system 111. Thereafter, the user computer 113 acquires the registration information and the setting information, and reflects them in the directory server 120.

In the user computer 113, the information acquisition unit 303 has a function of referring to the registered users of the file system 111 and to the setting about the access to the cabinet and reflecting them in the directory server 120 (this function will hereinafter be also called a "synchronizing function").

This synchronizing function is periodically and automatically processed by a Daemon program registered as a service for the user computer 113. This processing can be executed also by the system administrator when the necessity may arise. Switching of an operation mode of the synchronizing function described above is performed in advance as a system setting by the system administrator.

The following form can be applied as a definition of the schema in the directory server 120 described above.

For example, not the user class of the user utilizing the cabinet but the cabinet itself is defined as a class. In this case, it follows that the cabinet class has the encrypted user authentication information in a way that sets a value mapping to the cabinet user as an attribute.

The following is an exemplification of the object class and the attribute in the case described above by use of a directive defined in RFC2252:

objectclass (1.1.2.2.1 NAME 'cabinetName'
  DESC 'cabinet name'
  SUP top STRUCTURAL
  MUST ('encryptedUserPass'))

attributetype (1.1.2.1.1 NAME 'encryptedUserPass'
  DES 'encrypted password for user'
  SYNTAX 1.3.6.1.4.1.1466.115.121.1.40)
  <Operation of Network System 100>

Herein, an operation of the network system 100 configured to manage in unification the user authentication information registerable per cabinet, will be explained with reference to flowcharts shown in FIGS. 5 through 8.

Figure 5:
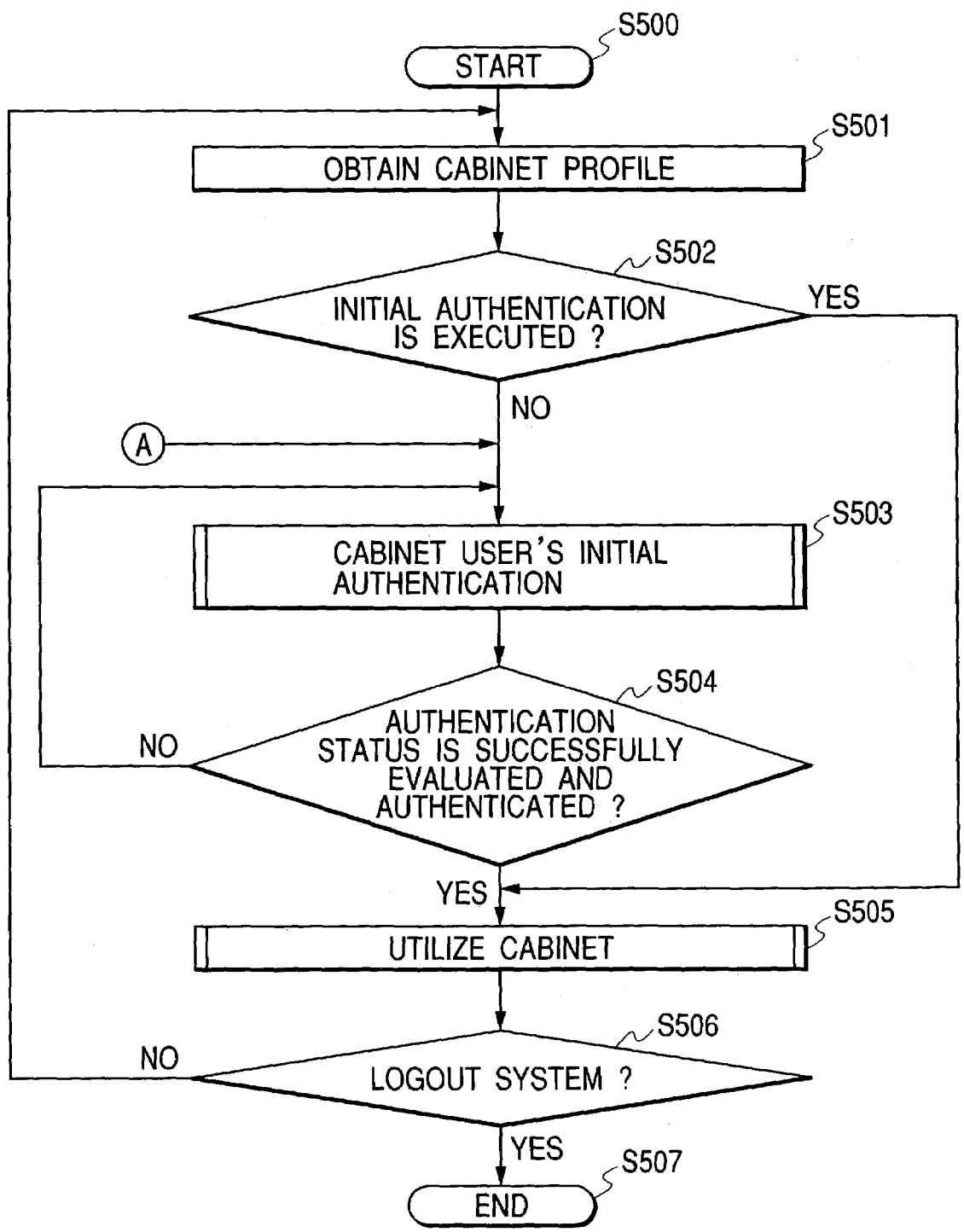
FIG. 5 is an explanatory flowchart showing the whole of processes in the network system.

(1) Main Processing (see FIG. 5)

Steps S500, S501:

The user starts up the user computer 113 (step S500), and performs an operation for accessing a desired cabinet in the file system 111.

Upon this operation, the user computer 113 obtains and refers to a profile of the cabinet to which the user desire to have an access (step S501), and acquires authentication server information (which is herein the information of the authentication server 130) for authenticating this desired cabinet.

Herein, the profile described above is stored with pieces of information such as address information (an IP address, etc.), authentication protocol information (the information about the authentication protocols such as NTML, Kerberos, or SSL, etc.) with respect to the authentication server (that is herein the authentication server 130) for authenticating the user's access to the cabinet.

Further, the profile is retained on the file system 111, and the user computer 113 refers to this profile on the file system 111, thereby specifying which authentication server authenticates and which authentication protocol is used by this authentication server.

The file system 111 retains the profile in consideration of a case where the authentication server for authenticating the user on the cabinet-by-cabinet basis might differ if a plurality of cabinets exist.

Step S502:

The user computer 113 retains information (an authentication status) showing whether the initial authentication of the cabinet accessed by the user has already been completed or not, and therefore obtains the profile from the file system 111 in step S501 and at the same time recognizes the authentication status as well.

With this operation, the user computer 113 judges whether the initial authentication of the user has been completed or not. As a result of this judgment, if the initial authentication is not yet completed, the user computer 113 advances to step S503 and, if the initial authentication has been completed and the user comes to a log-in status, skips over the initial authentication process of the user, thus diverting to step S505.

As described above, the scheme that the initial authentication process of the user is omitted if the initial authentication has already been completed, enhances the usability of the system.

Step S503:

As a result of the judgment in step S502, if the initial authentication is not yet completed, the user computer 113, though the details will be explained later on, executes the initial authentication in the file system 111.

Step S504:

The user computer 113 evaluates, based on the result of the initial authentication in step S503, the authentication status and, as a result of this evaluation, judges whether the user is a normal user registered beforehand or not.

As a result of this judgement, if the user is authenticated as the normal user registered previously, the user computer 113 advances to next step S505. Otherwise, if the user is not authenticated as the normal pre-registered user, for instance, if the user inputted an incorrect piece of initial authentication information and the user's authentication status is therefore unable to be authenticated, the user computer 113 returns to step S503 and waits for the correct initial authentication information to be inputted again by the user. Herein, the user computer 113, if the user has no normal system utilizing authority, likewise cannot advance to step S505 described above.

Step S505:

As a result of the judgment in step S504, if the user is authenticated as the normal user registered beforehand, the user computer 113 retains, as described above, the user's initial authentication information and, though the details will be stated later on, executes a process for performing the operation necessary for the user to actually access the cabinet.

Steps S506, S507:

The user computer 113, after the user has finished using the cabinet, judges whether a log-out instruction is given by the user (step S506).

As a result of this judgment, if log-out is instructed, this process normally comes to an end, and the user's initial authentication information and the authentication status which are retained on the directory server 120 are completely discarded (step S507). If on the other hand the user does not give the log-out instruction, for example, if the user simply temporarily finishes using the cabinet and desires to use the cabinet again, the processes from step S501 are executed.

Figure 6:
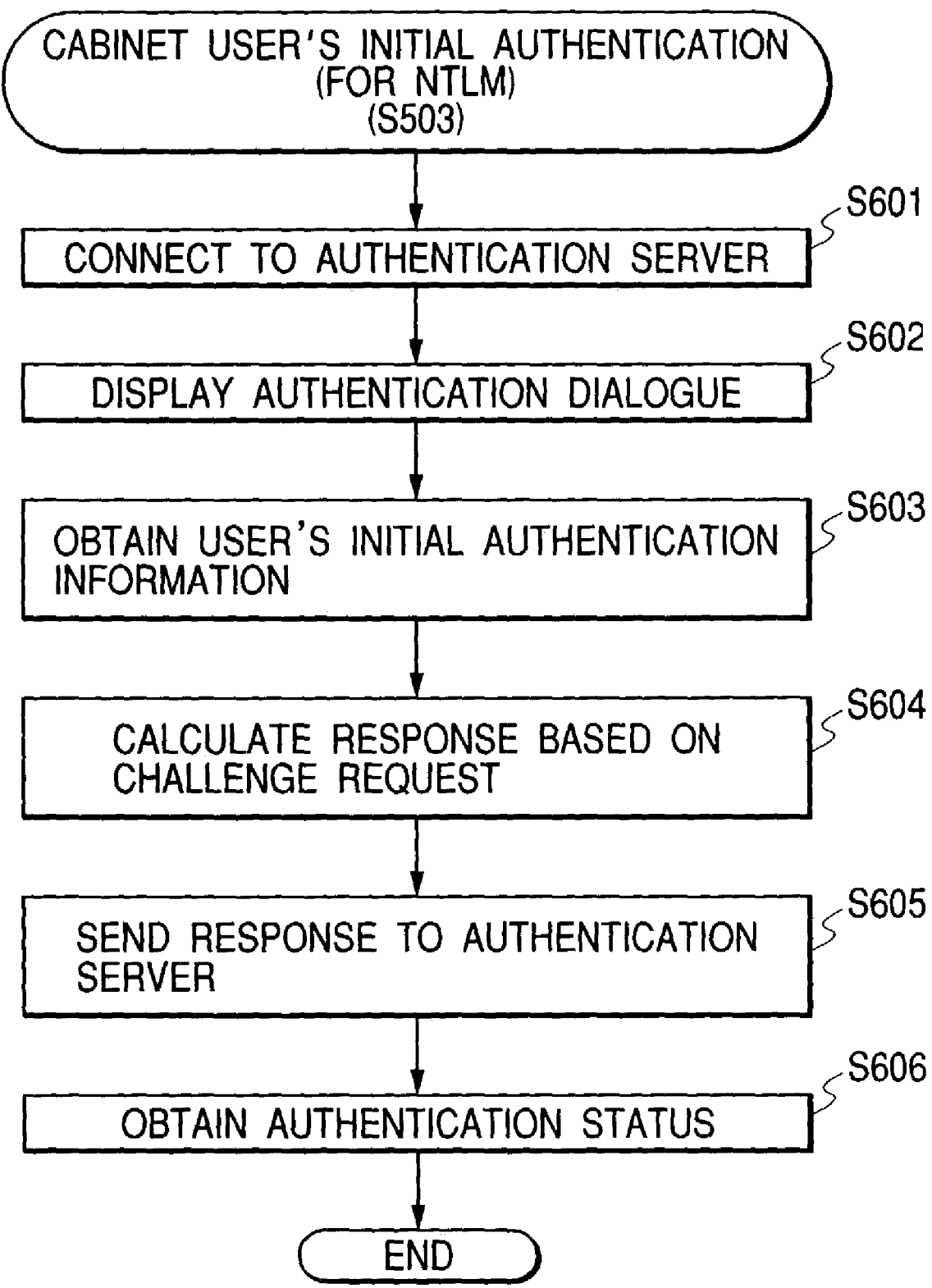
FIG. 6 is an explanatory flowchart showing an initial authentication process among the whole processes.

(2) Initial Authentication of Cabinet User (see FIG. 6)

Step S601:

As a consequence of the judgment in step S502 in FIG. 5, if the initial authentication of the user is not executed, on the occasion of a start of executing processes from next step S602, the user computer 113 already obtains the information showing which cabinet in the file system 111 the user tries to access and the information about the authentication server for authenticating the cabinet concerned.

Then, the user computer 113 specifies the authentication server 130 and an authentication method thereof from the information about the authentication server 130, and tries to establish a connection to the authentication server 130.

Step S602:

The user computer 113 succeeds in connecting to the authentication server 130 in step S601 and, when an authentication process based on the predetermined authentication method specified in step S601 is started in the authentication server 130, displays an authentication dialog box.

Note that when failing to establish the connection to the authentication server 130, the user computer 113 interrupts the execution of the processes from, e.g., step S601 and notifies the user of this purport by a method such as giving an indication in the dialog box, leaving a log file and so forth. Examples of failing to connect to the authentication server 130 are a fault on the network 150, a fault in the authentication server 130, etc.

Step S603:

When the authentication dialog box is displayed after the success in establishing the connection to the authentication server 130, the user inputs the initial authentication information known by only the user himself or herself into this authentication dialog box.

The user computer 113 thereby internally captures softwarewise the unique-to-the-user initial authentication information inputted into the authentication dialog box.

The above authentication information unique to the user is used for a subsequent authentication procedure with the authentication server 130.

According to this embodiment, the "NTML (Windows® NT LAN Manager) authentication protocol" supported in "Windows®" is to be utilized as a user authentication protocol by way of one example.

Step S604:

When the connection between the user computer 113 and the authentication server 130 is successfully established and the NYLM authentication process is started, the authentication server 130 transmits a challenge request to the user computer 102.

This challenge request contains an arbitrary value generated by the authentication server 130, and the user computer 113 calculates, based on this value, a response value to the authentication server 130. Further, the user computer 113 calculates the response value on the basis of the predetermined Hash algorithm and encryption algorithm by use of the initial authentication information unique to the user other than the arbitrary value contained in the challenge request.

Step S605:

The user computer 113, upon calculating the response value in step S604, sends this value back to the authentication server 130.

Herein, the Hash algorithm and the encryption algorithm are previously unified in a negotiation process between the authentication server 130 and the user computer 113. This negotiation process is executed as one process in step S601 wherein the user computer 113 connects to the authentication server 130.

Step S606:

The authentication server 130 compares the value calculated by executing the Hash algorithm and the encryption algorithm utilized on the user computer 113 in a way that uses the pre-registered initial authentication information unique to the user and the generated arbitrary value contained in the challenge request, with the response value sent back from the user computer 113. As a result of this comparison, if these values are coincident with each other, the user is authenticated, and the status (the authentication status) thereof is transmitted to the user computer 113, whereas if they are not coincident, the user is not authenticated, and an authentication status indicating this purport is transmitted to the user computer 113.

Accordingly, it follows that the user computer 113 judges from the authentication status sent from the authentication server 30 in step S504 shown in FIG. 5 whether the user is authenticated or not.

Note that in the case of using an authentication protocol other than the NTLM authentication protocol in the initial authentication process of the cabinet user (step S503) shown in FIG. 6, the processing sequence is, as a matter of course, changed based on this authentication protocol. The change in this processing sequence resides beforehand therein as a part of OS function on the user computer 113 and the authentication server 130, and switching thereof is carried out in establishing the connection (a handshake process in step S601) between the user computer 113 and the authentication server 130.

Figure 7:
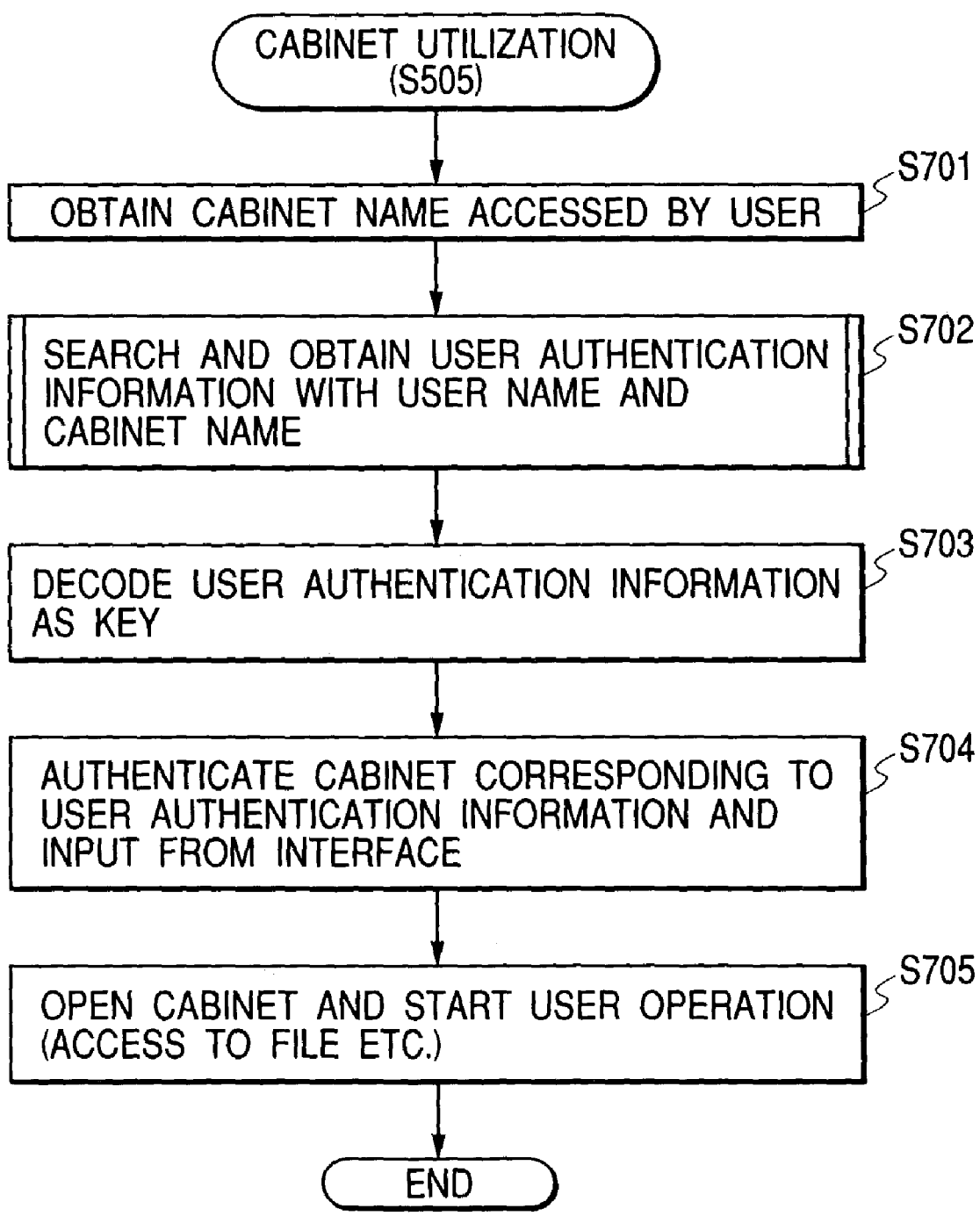
FIG. 7 is an explanatory flowchart showing a cabinet using process among the whole processes.

(3) Use of Cabinet (See FIG. 7)

Step S701:

As a result of the judgment in step S504 shown in FIG. 5, if the user is authenticated (success in authentication), the user concerned is able to utilize the cabinet in the file system 111.

Then, the user accesses, through the user computer 113, a desired cabinet in the file system 11.

The user computer 113 thereby acquires the cabinet name of the cabinet accessed by the user through the cabinet designation unit 302.

Step S702:

The user computer 113 acquires (fully described later on) a now-logging-in user name, then combines this piece of user name information with the cabinet name information obtained in step S701, and effects an LDAP search through the predetermined directory server 120 with these combined pieces of information serving as key information.

Step S703:

The user computer 113, since the user authentication information acquired by executing the process in step S702 has undergone, as described above, the encryption processing, decrypts the same encrypted user authentication information.

The decryption processing herein is executed based on the preset encryption algorithm, wherein the initial authentication information of the user is used as an encryption key.

Step S704:

The user computer 113 inputs the user authentication information decrypted in step S703 to the relevant cabinet authentication interface (UI 310).

For instance, the authentication dialog box can be applied as the cabinet authentication interface herein. In this case, the user authentication information after being decrypted is automatically inputted into this dialog box.

Note that a software interface designed for an exclusive use can be also applied as the authentication interface so as to be compatible with the system of the present invention. In this case, an API (Application Program Interface) with the cabinet authentication information used as an input parameter, is designed in advance on the user computer 113 in the file system 111. This scheme enables the information input unit 305 for inputting the user authentication information for the cabinet to transfer softwarewise the user authentication information for the cabinet to the file system 111. Further, a necessity for the cabinet authentication dialog box is eliminated.

Step S705:

If the file system 111 succeeds in the user authentication upon a completion of inputting the user authentication information into the cabinet, the user is enabled to access the cabinet concerned and gains a status of being able to start the user operation by opening this cabinet.

After the process in step S705, i.e., when the user finishes using the cabinet, it is judged in step S506 shown in FIG. 5 whether the user logs out or consecutively uses the cabinet.

There can be considered a case where the user again utilizes the same cabinet and a case where the user utilizes a different cabinet. In any case, the process (of obtaining the profile of the cabinet) in step S501 in FIG. 5 is executed.

For example, if the user accesses the cabinet retaining a profile with a different authentication server, it follows that the user, though the initial authentication of this user has already been done for the previous cabinet, does not yet have the initial authentication completed for the cabinet accessed afresh by the same user. Accordingly, it follows that the process (the initial authentication process) in step S503 is executed afresh for the user of the cabinet user.

If the user does not log out, as the initial authentication information and the authentication status of the user concerned are stored in the predetermined storage areas within the user computer 113, this user is able to utilize again the cabinet by use of these pieces of information (refers to step S504). On the other hand, when the user selects log-out, the use of the file system 111 comes to an end, and a necessary termination process is executed (refer to step S507).

Figure 8:
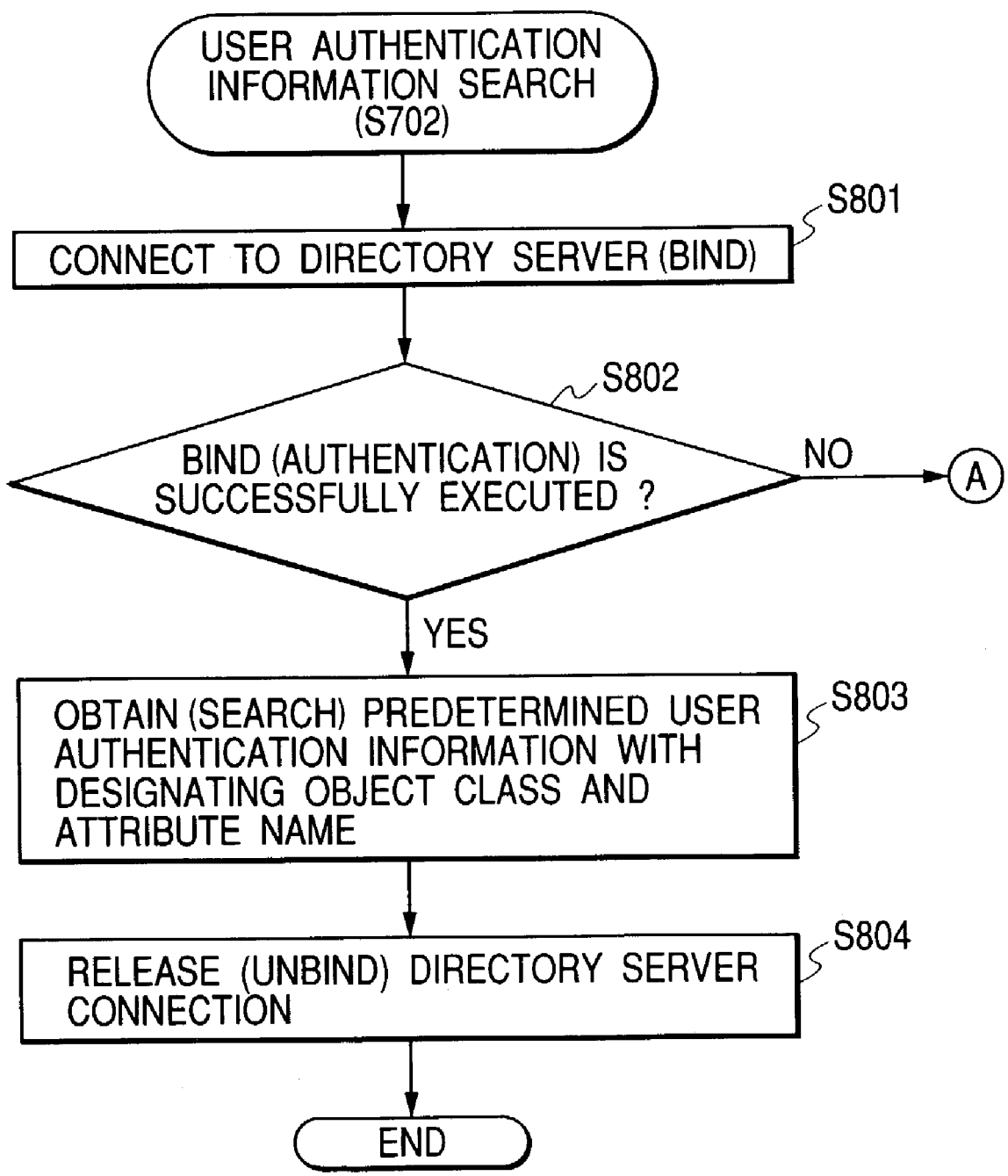
FIG. 8 is an explanatory flowchart showing a user authentication search process among the whole processes.

(4) Search for User Authentication Information (See FIG. 8)

Step S801:

The user computer 113, upon obtaining the cabinet name of the cabinet utilized by the user in step S701 shown in FIG. 7, executes, to begin with, an LDAP bind operation by use of the user's initial authentication information in order to acquire the user authentication information by searching for this item of information with the cabinet name and the user name used as keys in a way that executes an LDAP search operation.

Herein, the bind operation can serve to authenticate a user's access to the directory server 120. In this case, it is required that the user authentication information be designated as a parameter. This embodiment is, however, to utilize an anonymous simple bind operation, wherein the access authentication to the directory server 120 is not conducted. Accordingly, the user's authentication information for the directory server 120 is not required.

Note that even if the anonymous bind operation is carried out, the cabinet-by-cabinet user authentication information to be acquired is encrypted by the initial authentication information unique to the user, and therefore the confidentiality does not decline.

On the other hand, in the case of executing an authentication-based bind operation (simply called an authentication bind operation), the unique-to-the-user initial authentication information used when the user logs in, is used for an authentication parameter for the directory server 120.

In this case, to start with, the initial authentication information unique to the user is restored (retrieved) from the predetermined storage area on the user computer 113. A hash function for the thus restored initial authentication information unique to the user, is calculated by use of a predetermined hash algorithm. This hash function corresponds to an authentication parameter in the authentication bind operation.

The information acquisition unit 303 shown in FIG. 3 executes a directory server connection (bind) step (step S801) by use of this hash function.

A selection of whether the bind operation is conducted on the anonymous basis or the authentication basis, is determined by the initial setting of the system. Further, this setting is done by the user.

Moreover, whether the anonymous bind operation is performed or not is judged generally on the basis of throughput, etc., of the directory server 120. This is because if the anonymous bind is permitted, there is a possibility in which all the users including those having no access authority might try to connect with the directory server 120.

Step S802:

The user computer 113 judges, from a result of the bind operation in step S801, i.e., from a bind response given from the directory server 120, whether the bind (authentication) is successful or not.

As a result of this judgment, in the case of a failure in the bind operation, the user again needs to obtain the initial authentication information, the user computer 113 loops back to step S503 (the initial authentication step of the cabinet user) in FIG. 5. While on the other hand, in the case of a success in the bind operation (a success in the authentication), the user computer 113 advances to next step S803.

Step S803:

As a result of the judgment in step S802, if the bind operation becomes successful (the success in the authentication), the user computer 113 actually executes the acquisition of the authentication information of the cabinet user.

Note that the judging process in step S802 is not required in the case of carrying out the bind operation on the anonymous basis, and hence the user computer 113 goes directly to step S803, wherein the search operation is performed.

To be specific, the user computer 113, for instance, acquires (searches for) a predetermined item of user authentication information by designating an object class name (a value of "cabinetPerson") and an attribute name (a value of "encryptedPass").

As a result of the search operation, the encrypted user authentication information mapping to the predetermined cabinet is searched for and thus acquired in the directory server 120.

Step S804:

The user computer 113 moves the LDAP process to a directory server closing-the-connection (unbind) step.

A series of processing steps of the LDAP operation are thereby terminated, and the processes from step S703 shown in FIG. 7 for utilizing the cabinet are executed.

By the way, if another embodiment discussed above takes such a scheme that the information acquisition unit 303 obtains the relevant user authentication information not from the directory server 120 but from a predetermined storage area on the user computer 113, the step S702 of searching for and acquiring the user authentication information shown in FIG. 7 does not require a series of LDAP sequences of the bind operation through the search operation for the directory server.

Namely, the operation is simple enough to obtain the data stored in the storage area on the computer by executing a processing function call (or a processing sequence) for acquiring the user authentication information. The series of processing sequences are executed as operations of a program stored as software on the computer and as a data transfer process between registers. Pieces of user authentication information mapping to the cabinets and to the users are separately set and retained or all fixedly set as the case may be.

Note that the object of the present invention is, of course, accomplished also by supplying the system or the device with a storage medium stored with program codes of the software for actualizing the functions of the host and of the terminal in this embodiment, and making the computer (or a CPU and an MPU) of the system or of the device read and execute the program codes stored on the storage medium.

In this case, it follows that the program codes themselves read from the storage medium actualize the functions in this embodiment, and the storage medium stored with the program codes and these program codes configure the present invention.

The storage medium for supplying the program codes may involve the use of a ROM, a flexible disk, a hard disk, an optical disk, a magneto-optic disk, a CD-ROM, a CD-R, a magnetic tape, a nonvolatile memory card and so on.

Further, the functions in this embodiment are actualized by executing the program codes read by the computer, and besides, as a matter of course, there is included a case where the functions in this embodiment are actualized by a part or the whole of actual processes executed by the OS, etc., running on the computer on the basis of instructions of the program codes.

Moreover, it is taken for granted that there is also included a case where the program codes read from the storage medium are written to a memory provided in an extended function board inserted into the computer or in a function extended unit connected to the computer, and thereafter the CPU, etc., provided in the function extended board or in the function extended unit executes a part or the whole of the actual processes, thereby actualizing the functions in this embodiment.

Figure 9:
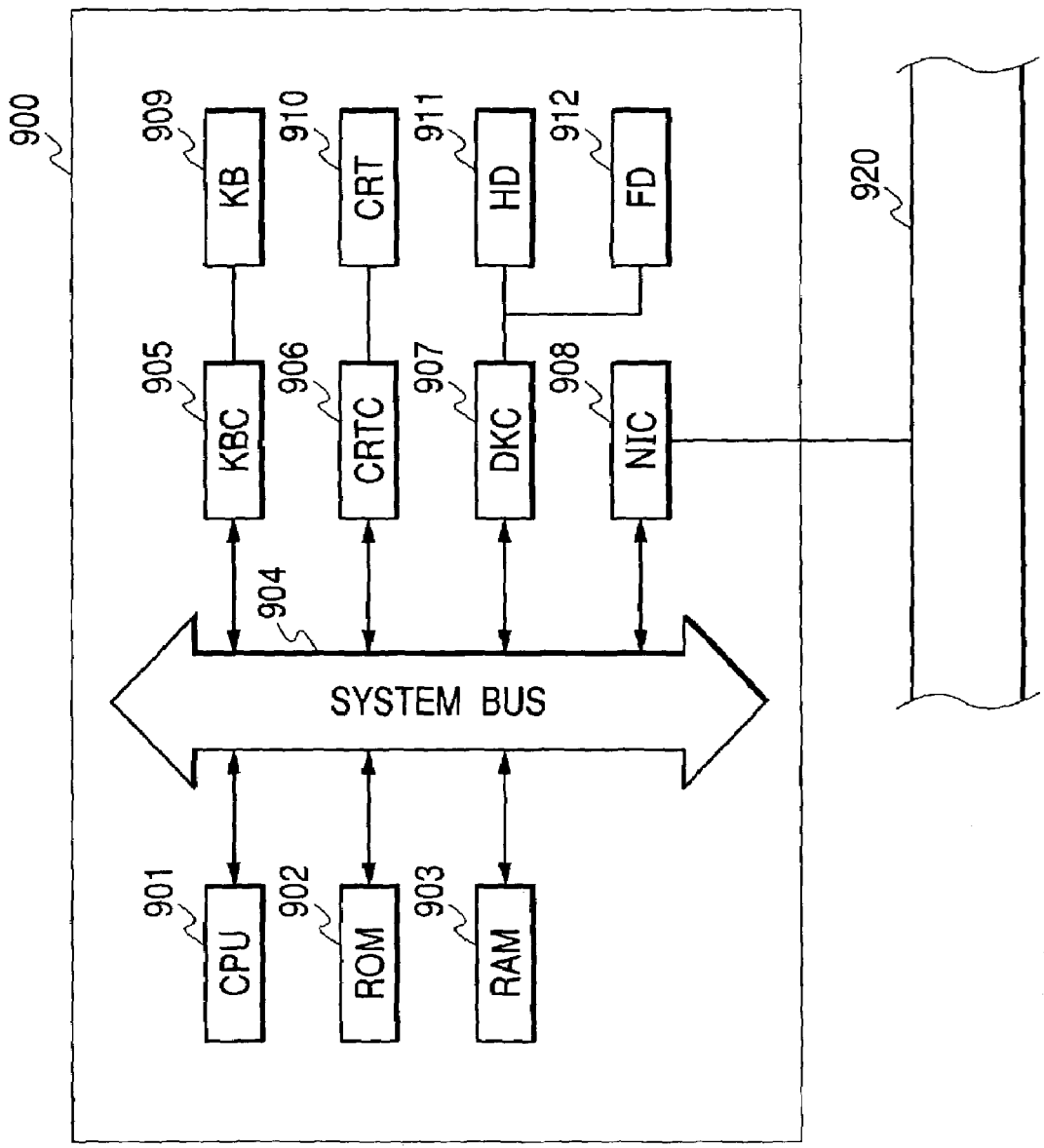
FIG. 9 is a block diagram showing an architecture of a computer for reading a program for making this computer actualize functions of the network system from a computer readable storage medium, and execute the same program.

FIG. 9 shows a function module 900 of the computer described above.

The computer function module 900 is, as shown in FIG. 9, configured such that a CPU 901, a ROM 902, a RAM 903, a keyboard controller (KBC) 905 of a keyboard (KB) 909, a CRT controller (CRTC) 906 of a CRT display (CRT) 910 as a display unit, a disk controller (DKC) 907 of a hard disk (HD) 911 and of a flexible disk (FD) 912 and a network interface controller (NIC) 908 for establishing connections to a network 920, are so connected as to be communicable with each other via a system bus.

The CPU 901 controls overall the respective components connected to the system bus 904 by executing the software stored on the ROM 902 or the HD 911 or the software supplied from the FD 912.

Namely, the CPU 901 performs the control for actualizing the operations in this embodiment by reading a processing program based on a predetermined processing sequence from the ROM 902 or the HD 911 or the FD 912 and executing this process program.

The RAM 903 functions as a main memory or a work area, etc., for the CPU 901.

The KBC 905 controls instruction inputs given from the KB 909 and an unillustrated pointing device, etc.

The CRTC 906 controls display on the CRT 910.

The DKC 907 controls accesses to the HD 911 and the FD 912 stored with a boot program, a variety of applications, edit files, user files, a network management program, the predetermined processing program in this embodiment, and so forth.

The NIC 908 transfers and receives the data interactively with the device or the system on the network 920.

As discussed above, according to this embodiment, when the user accesses (for using) an arbitrary cabinet, if the initial authentication of this user has already been done, the authentication information used when making the initial authentication is automatically set as the authentication information for accessing the cabinet this time, and therefore the user is not required to input the authentication information each time the user utilizes the cabinet, as required in the prior art.

Specifically, for instance, in the authentication of the individual cabinet in the existing digital complex device and in the file system, the user is enable to access all the cabinets as the user intends simply by undergoing the initial authentication once. The usability for the user can be thereby enhanced in the state of holding the confidentiality of the cabinet.

Further, to obtain the effects described above, there is basically neither a necessity of introducing a new type of device, a replacement of the version, etc., in the existing digital complex device and in the file system, nor an occurrence of a new burden on the user. Moreover, in the case of utilizing the existing in-office personal computer of the user and the authentication environment as they are, the authentication server in this authentication environment can be used directly as the authentication server of the system according to the present invention. These factors are effective in terms of the user's avoiding excessive investment in equipment.

Further, if the system is configured to use the international standard protocols and the encryption processing algorithm, there is a release from such a restriction as to depend on the specifications of the specified single sign-on system. Accordingly, the developers of the devices and applications are able to develop products based on flexible product specifications.

What is claimed is:

1. An information processing device capable of accessing a function providing party for providing a use of a cabinet function with authentication, said device comprising:

initial authentication means for performing a user's initial authentication using initial authentication information of that user;

retaining means for retaining information showing whether initial authentication of the cabinet function has already been done or not;

acquiring means for acquiring the initial authentication information, which differs from user to user, said acquiring means acquiring the initial authentication information if the information in said retaining means indicates that the initial authentication has already been performed;

cabinet designation means for designating at least one cabinet of a plurality of cabinets, wherein authentication information that differs from user to user and from cabinet to cabinet is assigned to each cabinet and is encrypted using the initial authentication information of the corresponding user;

setting means for, if the initial authentication has already been done based on the information in said retaining means, decoding the authentication information assigned to the cabinet that has been designated, using a corresponding user's initial authentication information acquired by said acquiring means, and setting the decoded authentication information; and authentication means for authenticating whether the corresponding user may use the designated cabinet or not, by using the authentication information which has been set.

2. An information processing system for managing in unity user authentication information registerable per cabinet, said system comprising:

function providing computer means for providing an authenticated cabinet function to a user;

server computer means having a directory function of managing user authentication information in unification as a database, searching for information in response to a query from the user, and sending a result of the search as a response to the query back to the user;

authentication server computer means for performing processing for authenticating the user, where authentication information that differs from user to user and from cabinet to cabinet is assigned to each cabinet of a plurality of cabinets and is encrypted using an initial authentication information of the corresponding user; and user computer means including a function of executing user authentication in a way that connects to said authentication server computer means, a function provided for the user to perform an operation with respect to a cabinet, and a user interface, wherein said user computer means includes:
- a user interface function provided for the user to input initial authentication information of that user in order to use that cabinet;
- an initial authentication function of authenticating the user by use of the initial authentication information in a way that connects to said authentication server computer means;
- a retaining function of retaining information showing whether initial authentication of that cabinet for that user has already been done or not;
- an acquiring function of acquiring the initial authentication information, which differs from user to user, said acquiring function acquiring the initial authentication information if the information retained by said retaining function indicates that the initial authentication has already been performed;
- a cabinet designation function for designating at least one cabinet of the plurality of cabinets;
- a decrypting function of decoding the authentication information assigned to a cabinet that has been designated by the user, using the initial authentication information of that user; and
- an input function of inputting the decoded authentication information as authentication information of the designated cabinet in said function providing computer means.

3. An information processing system according to claim 2, wherein the initial authentication information is used as unique authentication information necessary for the user to be authenticated by said authentication server computer means, and is also used for a process of decrypting the encrypted user authentication information related to the cabinet.

4. An information processing system according to claim 2, wherein the user authentication information is encrypted based on the initial authentication information of the user by the encrypting/decrypting function, and is retained on said directory server means in a way that relates the encrypted initial authentication information to the cabinet designated by the user or to the user identification information.

5. An information processing system according to claim 2, wherein said authentication server computer means is any one of a file server, a mail server, a schedule management server and a database server, or has a function as a server integrated with any one of the server functions, and also has a function of authenticating the user for the purpose of permitting the user to use the function concerned.

6. An information processing system according to claim 2, wherein said user computer means uses LDAP (Lightweight Directory Access Protocol) as a protocol for searching for and acquiring the information from said server computer means and as a standard directory control protocol.

7. An information processing system according to claim 2, wherein said user computer means and said function providing computer means are structured as physically indispensable devices existing as partial functions, and these two partial functions take such an architecture as to perform information communications based on a logical data exchange method in their interiors.

8. An information processing device comprising:
- a function of said information processing device according to claim 1, said function acquiring a relevant piece of authentication information from a predetermined storage area in a program preloaded into a storage area on a computer.

* * * * *